Oct. 14, 1958  C. R. SACCHINI  2,856,212
WINDSHIELD WIPER DRIVE ARM ADJUSTING DEVICE
Filed March 8, 1952
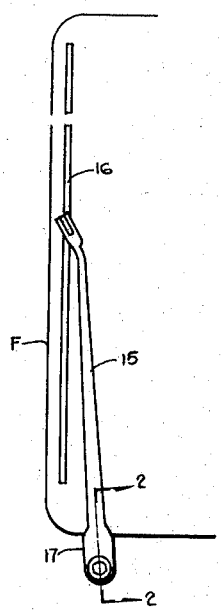
Fig. 1
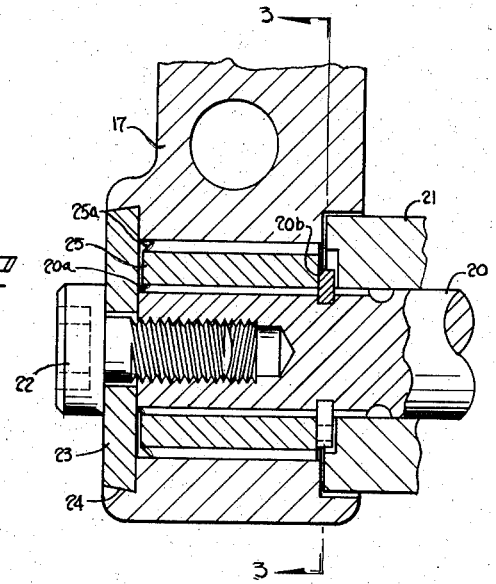
Fig. 2
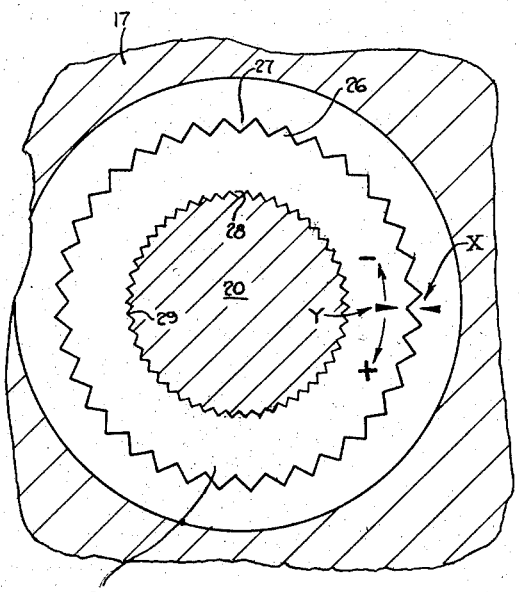
Fig. 3
Fig. 4
INVENTOR.
C. R. SACCHINI
BY
ATTORNEY

United States Patent Office 2,856,212
Patented Oct. 14, 1958

2,856,212

WINDSHIELD WIPER DRIVE ARM ADJUSTING DEVICE

Columbus R. Sacchini, Willoughby, Ohio, assignor, by mesne assignments, to Curtiss-Wright Corporation, Marquette Metal Products Division, Cleveland, Ohio, a corporation of Delaware Application March 8, 1952, Serial No. 275,645

2 Claims. (Cl. 287—53)

The invention relates to an adjustable connection between a windshield wiper drive arm and its drive shaft; and an object is to provide a positive torque transmitting mounting by which the drive arm, hence a wiper blade carried by the arm can be easily adjusted through a range of very small angles for precisely locating the blade with respect to the windshield framework or other reference member, or area, thus indicating the general object.

A more specific object is to provide an aircraft drive arm mounting such as outlined above including two sets of mating serration elements which, through permutative manipulation, will enable the wiper the be adjusted in equiangular steps less than the angular pitch of either set of serration elements.

Other objects and features will be brought out in connection with the following description of an illustrative form as shown in the drawing wherein;

Fig. 1 is a fragmentary front elevation of a windshield wiper drive arm and blade assembly, the view illustrating a typical parked position of the wiper; Fig. 2 is an enlarged sectional view of the mounting as indicated by line 2—2 on Fig. 1; Fig. 3 is a further enlarged sectional elevational view of portions of the mounting, the view being taken as indicated at 3—3 on Fig. 2, and Fig. 4 is an illustrative instruction sheet or chart showing a typical series of adjustment angles obtainable with the present mounting.

The drive arm 15 in Fig. 1, carrying a blade assembly 16, is shown in position such that the blade is directly adjacent a frame portion F. That may be taken to represent a "parking" position which may be at either end of the stroke of the wiper. The drive arm, through its mounting head portion 17, is secured to a drive shaft 20 which projects from the driving mechanism, not shown, through the vehicle framework in a suitable bearing sleeve 21 a portion of which appears in Fig. 2. A typical attaching means for the drive arm is illustrated by a screw 22, threaded into the outer end of the shaft and having its head tightly seated against an end plate 23 occupying a machined recess 24 in the outer face of the arm head portion 17. Such attachment is secure but enables easy assembly and disassembly of the drive arm and shaft.

In order to facilitate alignment of the serration teeth 26, 27 and 28, 29 pilot chamfers are formed, as at 25a and 20a Fig. 2, on one of the serrated members of each set of serrations. Also, as shown in Fig. 2, an axial shoulder 20b is provided on the drive shaft 20, for enabling clamping of the drive arm and adjusting ring assembly (17, 25) by tightening of the screw 22 but without interference with freedom of action of the drive arm and without danger of defacement of any of the serration teeth. The shoulder 20b, as illustrated, is the front face of a conventional snap ring, and this shoulder is located, along the shaft 20, a greater distance from the inner face of the end plate 23 than the axial length of the ring or sleeve member 25 of the assembly. Thereby said member is protected from being subjected to force such as could radially distort the member when the head of the screw 22 is tightened against the end plate 23. Member 25 must always be capable of being easily slipped by hand over the illustrated end portion of the shaft 20 and similarly must slide freely into and out of its illustrated position in the drive arm head portion 17 for reasons which will be explained below.

In aircraft wiper installations the operation of securing the drive arm in exactly the desired position on varying designs of aircraft windshields is made difficult by the facts that the drive shaft usually has a definitely limited arcuate motion and the drive arm and blade assembly has relatively great length. Thus in order to insure parking of the wiper close to the framework F at one end of the stroke, or for further example in order to insure wiping of the most effective area of the windshield, precise angular adjustment of the arm on the shaft is desirable in all cases and vitally necessary in others. Tapered circular shaft connections for wiper drive arms are already known by which any possible angular adjustment can be secured; but those connections are not positive and are inherently subject to becoming losened by repeated change in the direction of driving torque (usual alternate rotary motion).

In the present solution to the problem indicated above the ring or sleeve 25 is provided having external serrations 26 slidably mating internal serrations 27 formed in an appropriate bore of the drive arm, and internal serrations 28 which slidably mate external serrations 29 formed on or rigidly carried by the drive shaft. In the prior art such double sets of mating serrations have been used, the mating elements of one set forming a permanent connection, as by a drive or shrink fit, and the elements of the other set being used to obtain equiangularly stepped wiper position adjustments during installation of the wiper equipment. The two sets of serrations in the present subject bear a predetermined relationship to each other such that by turning the ring 25 in one direction or the other from a trial position (as by reference to chart C, Fig. 4, first column), before sliding the ring into place, and then turning the assembly comprising the drive arm and serrated ring in the opposite direction (as by reference to the second column on the chart), before applying the arm and ring assembly over the drive shaft serrations 29, the angular position of the drive arm assembly can be as finely adjusted as desired in accordance with the selected combination or permutation of movements.

In the illustrated arrangement one set of serration elements, preferably the inner set 28, 29, comprises 50 teeth which represents an angular pitch of 7.2° and the other set has 36 teeth or an angular pitch of 10°. The reason why the coarser teeth are preferred in the outer set of serrations is that those are the only mated teeth which are exposed to view when the drive arm, with the adjusting ring 25 still in place, is removed from the shaft after trial partial installation of the arm has been effected in order to determine what adjustment angle is required, thus making the logical first step in the adjusting procedure that of repositioning the ring in the arm. That is the only procedural step which requires knowledge of the permutations given on the chart C or reference to it, because if the operator effects the proper repositioning of the ring through a selected number of tooth spaces given in the first column on the chart (assuming further that the required angle of adjustment has been ascertained and appears in the third column opposite such number) the second column of figures can be disregarded, for the serrations between the repositioned ring and the drive shaft are certain to slide into mesh when the drive arm is reapplied in correct position.

Thus the proper direction of repositioning of the ring 25 to obtain for example an arm-angle-readjustment of 3.2° (see third column on chart, line 8) is four tooth spaces counterclockwise (i. e. minus 4 per chart); and then, if the arm is placed in its 3.2° shifted position on the windshield the relative angular repositioning of ring 25 and the shaft will have required six inner serration space turning clockwise (i. e. plus 6 per chart). The above described and similar operations can of course be accomplished by trial and error. Reference to the chart and indicia on the parts, which latter may be omitted in practice, simply saves time.

Referring again to the depicted combination of serration elements (50 teeth with 36 teeth) that combination, in which the angular pitches of the two sets of serrations have no common divisor in terms of whole angular degrees, results in the relatively small difference in the complete series of angles between consecutive adjustments (i. e. four-tenths of a degree). If for example a combination of 36 teeth and 72 teeth were to be used then the smallest available increments of arm adjustment would be 5°, and a 40 teeth–60 teeth combination yields 3° as the smallest increments. Incidentally if the indicated directions (+ and −) were relatively reversed the same increments of drive arm adjustment would be had but in the opposite direction from the initial or reference position.

It will be apparent that the invention enables far finer adjustment of drive arm position than could practically be attained by relative movements of a single set of mating serrations through combinations representative of their angular pitch, since the maximum number of teeth that can be formed in a set of serrations is limited by manufacturing difficulties which increase as angular tooth spacing decreases.

In using the series of .4° increments shown in the third column on chart C the increment (4.8°) being more than half of one serration tooth (7.2°) manifestly enables adjustment of the drive arm to any angle between 0° and 7.2° which angle is some whole multiple of .4°.

I claim:

1. In the combination comprising a rotary wiper drive shaft projecting as a cantilever from its supporting bearing and adapted to be turned to and fro in the bearing through a uniform angle by power mechanism, and an arm adapted to support a wiper and extending transversely of the axis of the shaft; connecting means between the arm and shaft comprising an axial shoulder on the shaft, a circular series of serration teeth on the shaft parallel to said axis and disposed beyond the bearing toward the free end of the shaft, a metal sleeve having internal serration teeth easily slidable by hand over the shaft teeth for their entire length to permit the sleeve to be slid into operative abutment with said shoulder in various turned positions of the sleeve relative to the shaft, the sleeve having external serration teeth parallel to said axis and said arm having a socket defined in part by a circular series of serration teeth mating the external teeth of the sleeve and easily slidable thereover by hand, the internal teeth of the sleeve differing in angular pitch from the external teeth of the sleeve by an amount that will enable angular adjustment of the arm on the shaft in equal steps less than the angular pitch of either the internal or the external teeth of the sleeve, the arm having a rigid wall portion forming the bottom of the socket, and an attaching member removably screw threaded to the free end of the shaft, said attaching member having a shoulder engaging the arm in a direction to clamp said wall portion operatively against the free end of the shaft, the length of the serrated sleeve being less than the distance between said shoulder of the shaft and the bottom of the socket, whereby the sleeve cannot be subjected to distorting force axially by the attaching member through said wall portion during the operation of mounting the wiper arm on the drive shaft.

2. The construction according to claim 1, wherein said wiper supporting arm has a main metal body member containing all portions of said internal serration teeth of the arm, and said rigid wall portion of the arm is a metal plate larger than the circle defining the root portions of the internal serration teeth of the arm, the plate being permanently secured tightly to said body member to define the bottom of the serrated socket.

References Cited in the file of this patent
UNITED STATES PATENTS

| | | |
|---|---|---|
| 1,511,910 | Royce | Oct. 14, 1924 |
| 2,286,035 | Horton et al. | June 9, 1942 |
| 2,315,350 | Rappl | Mar. 30, 1943 |
| 2,443,688 | McFarland | June 22, 1948 |

FOREIGN PATENTS

| | | |
|---|---|---|
| 652,278 | France | 1929 |